(12) United States Patent
Kwan

(10) Patent No.: US 7,222,077 B2
(45) Date of Patent: May 22, 2007

(54) BILLING METHOD AND SYSTEM FOR COLLABORATION SOLUTIONS

(75) Inventor: Edmund Ming Kwan, Cupertino, CA (US)

(73) Assignee: Edmund Kwan, Cupertino, CA (US)

( * ) Notice: Subject to any disclaimer, the term of this patent is extended or adjusted under 35 U.S.C. 154(b) by 428 days.

(21) Appl. No.: 10/071,768

(22) Filed: Feb. 7, 2002

(65) Prior Publication Data

US 2003/0149575 A1 Aug. 7, 2003

(51) Int. Cl.
*G06F 17/60* (2006.01)

(52) U.S. Cl. .......................................... 705/1
(58) Field of Classification Search .................. 705/1, 705/500, 14, 26, 27, 30, 32, 34, 35, 39, 40, 705/42, 400, 29
See application file for complete search history.

(56) References Cited

U.S. PATENT DOCUMENTS

| | | | |
|---|---|---|---|
| 5,631,904 A * | 5/1997 | Fitser et al. ................ 370/261 |
| 6,035,281 A | 3/2000 | Crosskey et al. | |
| 6,119,109 A | 9/2000 | Muratani et al. | |
| 6,304,857 B1 * | 10/2001 | Heindel et al. ................ 705/34 |
| 2002/0032602 A1 * | 3/2002 | Lanzillo, Jr. et al. ......... 705/14 |
| 2002/0198782 A1 * | 12/2002 | Shorter ........................ 705/14 |
| 2003/0005133 A1 * | 1/2003 | Banerjee et al. ............ 709/229 |
| 2005/0043060 A1 * | 2/2005 | Brandenberg et al. ...... 455/558 |
| 2005/0055306 A1 * | 3/2005 | Miller et al. .................. 705/37 |

FOREIGN PATENT DOCUMENTS

JP 411213032 A * 8/1999

OTHER PUBLICATIONS

Messerschmitt, David G. "Multiple Access". The Internet print out; 1999; 4 pages.*
Provisional application submission of Gary T. Shorter, filed on Jun. 22, 2001, and recorded under provisional U.S. Appl. No. 60/299,794, 2 pages.

* cited by examiner

*Primary Examiner*—Igor N. Borissov (57) ABSTRACT

Methods and systems for service providers to provide hosted enterprise solutions to businesses, allowing these businesses to collaborate with other business partners or clients, via the Internet. Under such systems and methods, service providers would allow clients to decide which partners to invite to enroll in subscription plan in order to share and minimize the cost to the clients without having the clients incur a cumbersome approval process from all their partners.

24 Claims, 6 Drawing Sheets

Date: January 1, 2xxx

|  | Collaboration community Members | Invitees (Invitations to be sent) | Subscribers signed | Invitees declined subscription | Indecisive invitees | Subscribers needed to waive subscription | Goal |
|---|---|---|---|---|---|---|---|
| QT'Y | 100 | 80 | 0 | 0 | 0 | 75 | 75 |
|  | 1 | 2 | 3 |  | 5 | 6 |  |

Date: January 15, 2xxx

|  | Collaboration community members | Invitees (Invitations to be sent) | Subscribers signed | Invitees declined subscription | Indecisive invitees | Subscribers needed to waive subscription | Goal |
|---|---|---|---|---|---|---|---|
| QT'Y | 100 | 0 | 25 | 3 | 52 | 75 | 50 |
|  |  |  | 7 | 8 | 9 |  | 10 |

Date: January 25, 2xxx

|  | Collaboration community members | Invitees (Invitations to be sent) | Subscribers signed | Invitees declined subscription | Indecisive invitees | Subscribers need to waive subscription | Goal |
|---|---|---|---|---|---|---|---|
| QT'Y | 100 | 0 | 60 | 4 | 16 | 75 | 20 |

Date: February 20, 2xxx

|  | Collaboration community members | Invitees (Invitations to be sent) | Subscribers signed | Invitees declined subscription | Indecisive invitees | Subscribers need to waive subscription | Goal |
|---|---|---|---|---|---|---|---|
| QT'Y | 100 | 0 | 76 | 6 | 0 | 75 | 0 |
|  |  |  | 12 |  | 11 | 13 | 14 |

FIG. 3

Service Provider's subscription plan.

|  | Types of subscription plan | Collaboration Community size (partners) | Subscription fee | Additional partner/month |
|---|---|---|---|---|
|  | A | Up to 50 | $5,000 | $100/ea |
| 5 | B | Up to 70 | $6,650 | $95/ea |
|  | C | Up to 100 | $9,000 | $90/ea |
| 18 | D | Up to 130 | $11,440 | $88/ea |
|  | E | Up to 150 | $12,900 | $86/ea |

Service Provider's cost sharing plan to clients. — 32

-Each new subscription will generate $200 for the service provider and $100 credit for the client, which can be used to offset subscription fees.

Example 1.

Clients signed up for subscription plan type B and had 75 partners. In the same month, he generated 55 new subscribers. His subscription fee will be calculated as follows:

11
Subscription fee:     $6,650 + (5 x $95) = $7,125
Credit earned:        55 x $100=$5,500                16
Net subscription fee: $7,125-$5,500=$1,625
                                                12
14

Example 2.

Clients signed up for subscription plan type D and had 135 partners. In the same month, he generated 75 new subscribers. His subscription fee will be calculated as follows:

24
Subscription fee:     $11,440+(5 x $88) = $11,880
Credit earned:        75 x $100=$7,500                26
Net subscription fee: $11,880-$7,500 = $4,380         22
                                                      28

↔ Full collaboration privileges for the clients.

- Clients do not have collaboration restrictions of partners listed below.

◄┅► Limited collaboration privileges for the subscribers
- Partners cannot dictate where their documents can go except to the client.
- Partners cannot see documents of other partners.
- Partners cannot design and execute flows.

Subscribers and non-subscribers have the same collaboration privileges.

BILLING METHOD AND SYSTEM FOR COLLABORATION SOLUTIONS

The present invention generally relates to the costing and billing methods of service providers to their Clients, who use collaboration enterprise applications via the Internet hosted by service providers and, more particularly, a cost-sharing system provided by the providers to the clients to manage billing activities among their collaboration communities.

The following lists the meanings of some terms as used herein:

Partner: A business, an individual or a group with whom Clients use the enterprise solution to collaborate.

Service Provider: A company, which provides enterprise solutions or enterprise solutions accounts to individuals, businesses, and other groups.

Client: A business, an individual and a group that has been committed to use hosted enterprise solutions provided by the service provider.

Collaboration community—A client and all of its collaboration partners

Subscriber: A partner who purchased a subscription with the service provider.

Invitee—A partner who will be invited to become a subscriber.

Enterprise solution: A software solution that improve productivities, which can be used by more than one person.

Online solution: An enterprise application that runs and executes on the Internet.

Billing solution—an enterprise solution available online, provided by the service providers to the Clients, that allows the clients to administrate the cost-sharing program within their collaboration communities.

External revenue—total revenue of a particular collaboration community to the service providers, excluding client's contribution.

BACKGROUND OF THE INVENTION

Whereas clients are often responsible for the cost when they are committed to use enterprise solutions hosted by service providers to collaborate with their partners via the Internet, their partners are often not. Since the partners get to use the solutions paid for by the Clients, although sometimes with relatively limited functions, they now have little incentive to subscribe to such enterprise solutions from the service providers.

Thus, the client is often the only paying party in his collaboration community. This is not a fair model. In the long run, clients would harbor resentment for being the only payee in the collaborating community, resulting in potential loss of business for the service providers.

There are also those solutions hosted by service providers that require all participants within the collaboration community to pay subscription fees based on an open formula, which treats all participants equally. A Client, who chooses these solutions, may invite others to join. In this model, clients typically obtain approvals from all participants. This is a very cumbersome process. Until every partner reaches an agreement, collaboration solutions cannot begin to execute.

There are also those solutions hosted by service providers that require all participants within the collaboration community to pay subscription fees, according to different formulas. They nonetheless still require a complex approval process.

SUMMARY OF THE INVENTION

Clients would be better served if there were ways for them to share the enterprise solutions cost with their collaborating partners and that require only simple procedures for approval and consent.

A cost-sharing system and method for the clients is provided, allowing them to adapt enterprise solutions hosted by the service providers, and to share such solutions costs with partners with whom the clients feel are willing to share costs, while also collaborating with those who will not.

Cost-sharing systems are provided by the service providers to the clients, allowing the clients to improve the management of cost-sharing administration of their collaboration communities.

Systems and methods according to some embodiments of the present invention also allow the service providers to reward the clients for their efforts in organizing and starting their collaboration communities, such that the entire subscription fees of the clients may be waived.

Traditionally, clients would make financial commitments to the service providers for the privilege of using any types of enterprise solutions to collaborate with their partners via the Internet. In one embodiment according to the present invention, the clients would now have, in addition to the above, the rights to invite his partners to sign up with the service provider directly. The clients will be given the flexibility to decide which partners to invite. Traditionally, clients are not given the flexibility of creating an invitee list.

Thus, the more subscribers the clients can generate, the less the financial obligation they have to the service providers. Potentially, the clients may be able to pass the entire cost of subscriptions to all of the subscribers, provided that the amount of external revenue, which is pre-determined by the service providers, has been reached. Pre-determined figures can be changed from time to time, as desired by the service providers.

To manage the dynamic membership status of partners, invitees and subscribers within a certain collaboration community, the service providers would provide cost-sharing management systems to the clients to allow them to manage and administrate the cost-sharing programs. Clients can use this management tool to manage the process of cost-sharing and be able to control and monitor their own subscription fees periodically.

The cost-sharing management system would allow the Clients to send electronic messages to all the invitees within the clients' collaboration communities, inviting them to become subscribers. If the invitees were interested, they would be able to enroll subscription online at the service providers' enrollment web sites. If the invitees do not wish to enroll via the service providers' web site, they could contact the service providers to arrange for other means of enrollment.

Once the service providers accepted the invitees' applications for subscriptions, the invitees have become subscribers. The service providers would update the system, thus acknowledging the clients that their invitees are now subscribers. If the invitees decided not to become subscribers, they would also notify the service providers at enrollment web site. Service Providers will update the systems and allow access by their clients.

Clients are only given authorized access on their own unique collaboration communities.

Service providers would maintain a listing of unresponsive invitees, which can be accessed by the clients; the clients can send additional messages to urge the unresponsive invitees to make a decision. This process will continue, if desired by the clients, until hopefully all the invitees have come to a decision.

The clients now begin a mature and a routine phase of subscription management.

DETAILED DESCRIPTION

Figure 1:
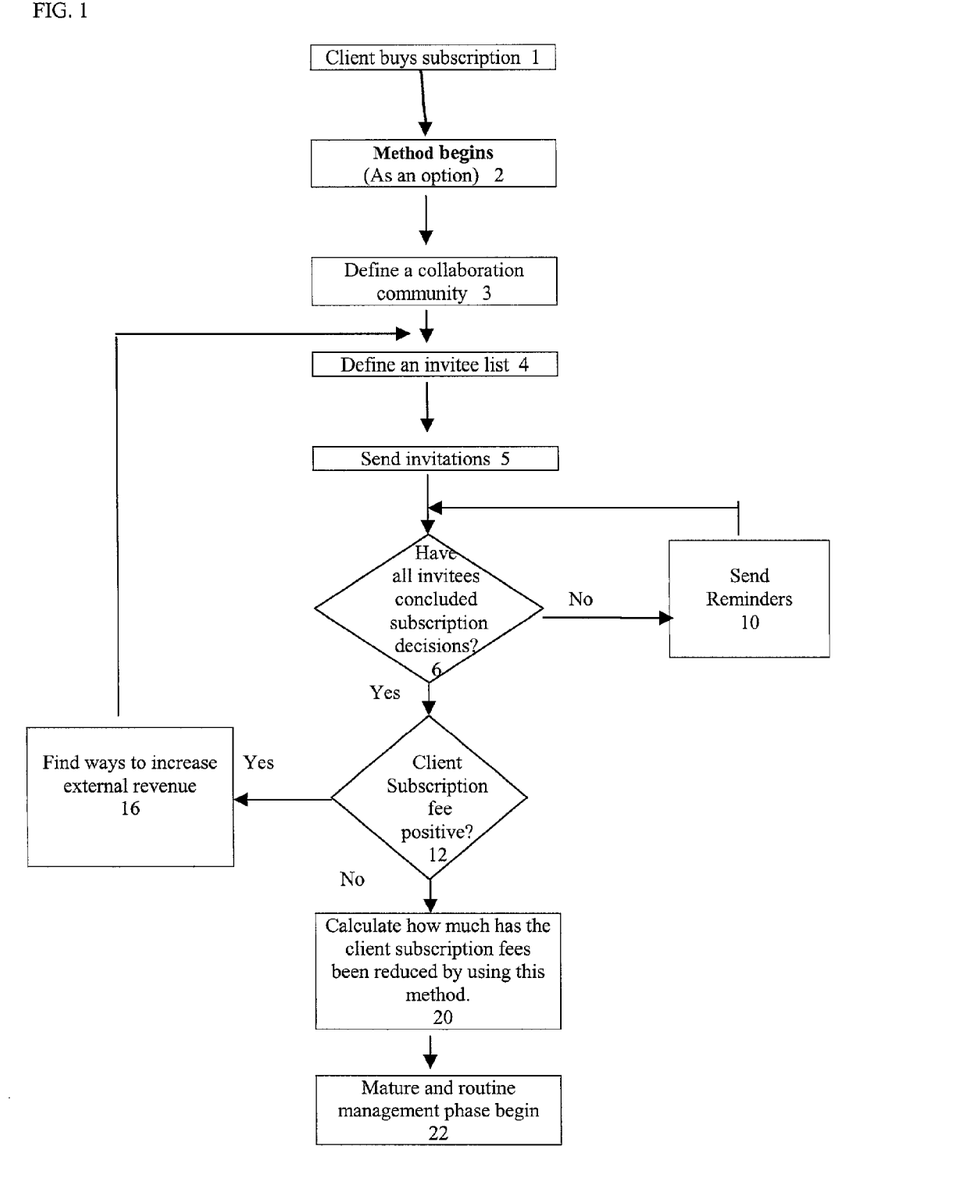
In FIG. 1, a flow chart elucidating one embodiment according to the present invention.

Referring to FIG. 1, at step 1, client buys a subscription with the service provider for usage of an enterprise solution for collaboration purposes. The enterprise solution could be developed in-house by the service provider, by an external $3^{rd}$ party or jointly developed by both service provider and the external $3^{rd}$ party.

Typically, the subscription procedures end here.

At step 2, the client can use this method, as an option, to reduce his subscription fee.

At step 3, the client begins by defining all the partners with whom he wishes to collaborate, known as a collaboration community.

At step 4, the client would create a list within the collaboration community, known as an invitee list, by using the billing solution facilitated by the service provider. An invitee is a partner the client feels would be willing to buy a subscription.

When a partner is not included in the invitee list, this may imply that the client could be intending to either pay, or to generate more external revenue elsewhere to earn credit to cover the enterprise solution fees for this partner's usage.

An invitee list will change from time to time since clients' assessment of each invitee changes from time to time.

At step 5, the solution would also facilitate mail merge, merging invitees with invitation templates to generate invitations, inviting invitees to buy subscriptions directly with the service provider.

At step 6, the client would use the billing system to monitor the number of indecisive invitees. If he feels that they should be reminded, he will proceed to generating more reminders via the billing system 10. The number of undecided invitees should become less as more invitees come to the subscription conclusion.

The reminder generation process would be repeated until hopefully all the invitees have concluded the subscription decisions.

There are times although the number of inconclusive invitees is still positive, the client may decide not to generate any reminders. Step 10 and step 12 can be executed in parallel.

At step 10, client would generate reminders via the client billing system from time to time to urge the indecisive invitees to quickly conclude the subscription decisions.

At step 12, until subscription fee reaches zero, the client should continue to find ways to increase external revenue. Please be advised that the client does not have to wait until his subscription fee has been reduced to zero before proceeding to step 20. Step 20 and 16 can be executed in parallel.

At step 16, the client would want to earn more credit by further increase external revenue, thus generating more credit to offset the subscription fee. External revenue could include but not limited to revenue of subscribers' subscription fees, revenue of subscribers' users subscription fees and revenue on collaboration data volume.

At step 20, at any time, the client is in a position to calculate how much credit he earned with the external revenue he generated. He can now see how much the subscription fee is reduced by using this method.

At step 22, the client now enters a more mature and routine management phase of managing the cost-sharing program.

Without this method, the client would either typically pay for the solution, thus being the only payee in the collaboration community, or he would have to obtain other partners' agreement to buy subscription before collaboration can begin to execute, thus going thru a cumbersome process.

This flow chart illustrated that this method makes it possible for the service providers to reward clients for their efforts in building a collaboration community and ability to generate external revenue for the service provider.

Figure 2:
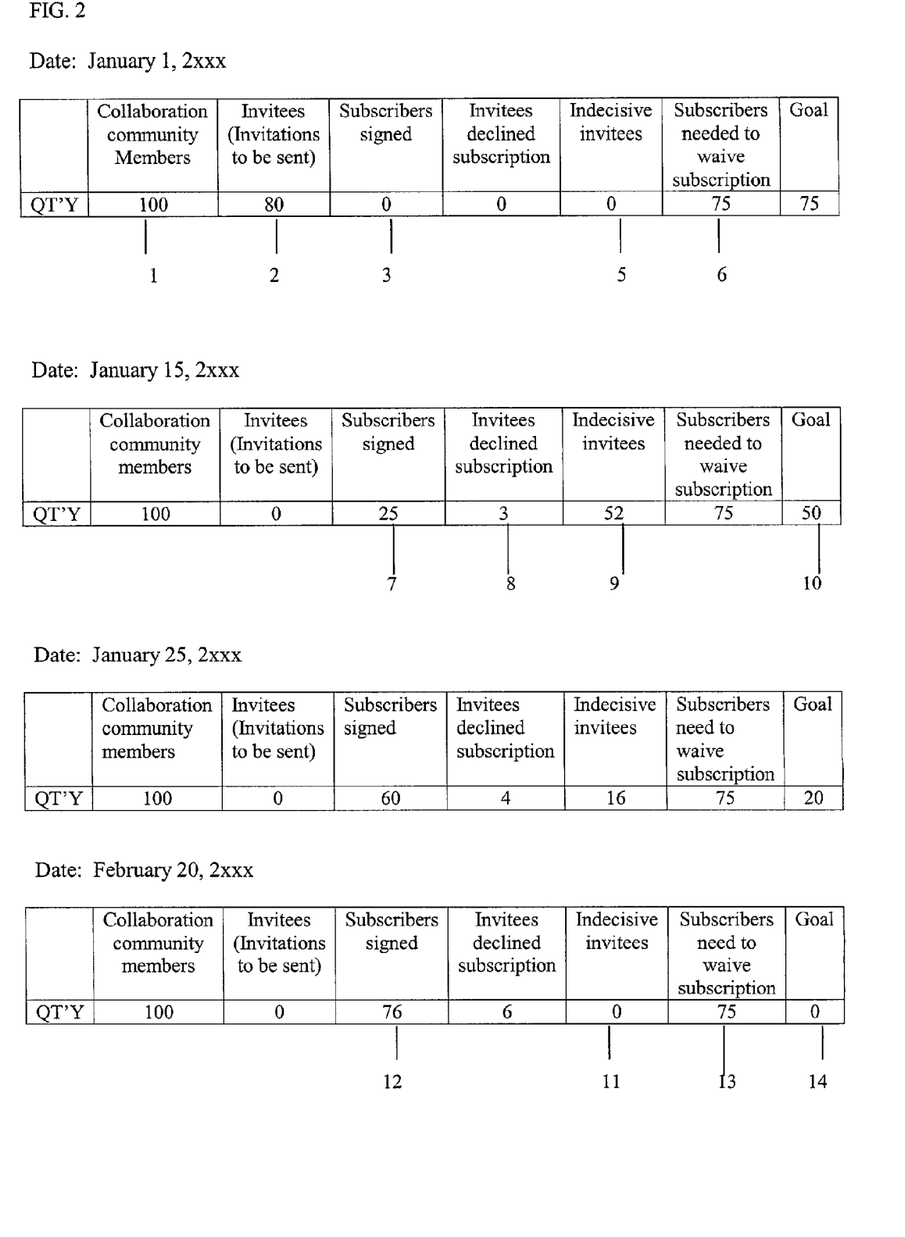
In FIG. 2, a system of cost-sharing solution is depicted, allowing the client to manage, for example, the number of subscribers against the goal set forth by the service providers.

Referring to FIG. 2, at label 1, on Jan. 1, 2xxx, a client had just signed up for a subscription plan of 100 partners. The service provider would offer a billing solution to this client, thus allowing this client to administrate his unique collaboration community. His collaboration community comprises of 100 partners.

At label 2, he created an invitees list of 80 partners. He began to send invitations to the 80 invitees.

At label 3, since he has not sent any invitations to invitees, no invitees have signed up.

At label 5, the client also had no indecision invitees since no invitations have been sent.

At label 6, the service provider had set a goal of 75 new subscribers to the client in order for him to completely waive his subscription fee.

At label 7, on Jan. 15, 2xxx, twenty-five invitees bought subscriptions.

At label 8, three invitees had declined subscriptions.

At label 9, since fifty-two invitees were indecisive, he began to generate reminders using the client billing system to urge the indecisive invitees to conclude subscriptions.

At label 10, he needed fifty additional subscribers to reduce his subscription fee to zero.

At label 11, the reminder generation process repeated until February 20, where the indecisive invitee number has been reduced to zero. At this point, he no longer needed to generate reminders.

At label 12, he had generated seventy-six new subscribers for the service providers.

At label 13, he has surpassed the goal set forth by the service providers.

Once the clients reach the goal set forth by the service providers, the billing solution will invoke an electronics message to the clients to inform the goal has been reached.

If the client had exceeded the goal set forth by the service providers and then lapsed below the goal, the billing solution will invoke an electronics message to the clients to inform the goal has been lapsed.

At label 14, the client no longer needed to generate additional subscribers since he had reached the goal.

The Client has successfully reduced his subscription fee to zero by using this method.

Figure 3:
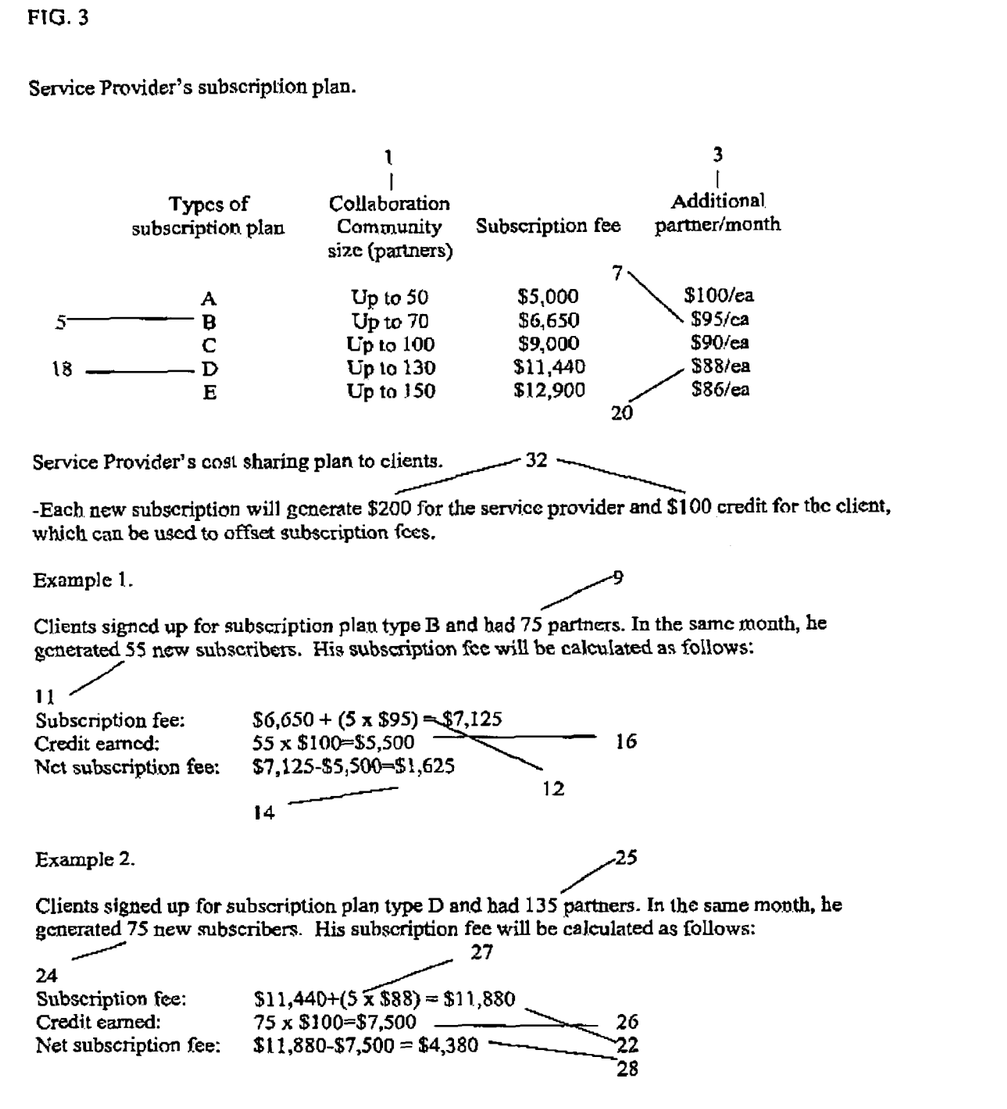
In FIG. 3, a system of cost-sharing solution facilitating the usage of subscriber revenue, as an example, to earn credits for the client.

Referring to FIG.3, at label 1, this subscription plan, as an example, rewards clients who commit to larger collaboration communities.

At label 3, notice an additional partner cost becomes lower as the community becomes larger.

At label 5, in example 1, the client signed up for a type B subscription plan, which required the client to pay $95 per partner for each partner exceeding 75.

At label 9, the client had seventy-five partners.

At label 11, he generated fifty-five new subscribers

At label 12, the client ended up with a subscription fee of $7,125.

At label 16, he earned credit of $5,500, equals a net saving in the same amount.

At label 14, his net subscription fee was reduced from $7,125 12 to $1,625.

At label 18, in example 2, the client signed up for a type D subscription plan, which required the client to pay $88 per partner for each partner exceeding 130.

At label 25, the client had one hundred thirty-five partners.

At label 27, the client had five partners 27 above the plan limitation.

At label 20, he had to pay for the five extra partner cost, which is $88 each.

At label 22, he ended up with a subscription fee of $11,880.

At label 24, he generated seventy-five new subscribers.

At label 26, he earned credit of $7,500, equals a net saving of the same amount.

At label 27, the client exceeded the subscription plan by 5 partners. Based on the subscription plan he bought, each partner cost is $88.

At label 28, his net subscription fee was reduced from $11,880 22 to $4,380.

At label 32, notice in this example, the external revenue amount is greater than the credit amount.

Figure 4:
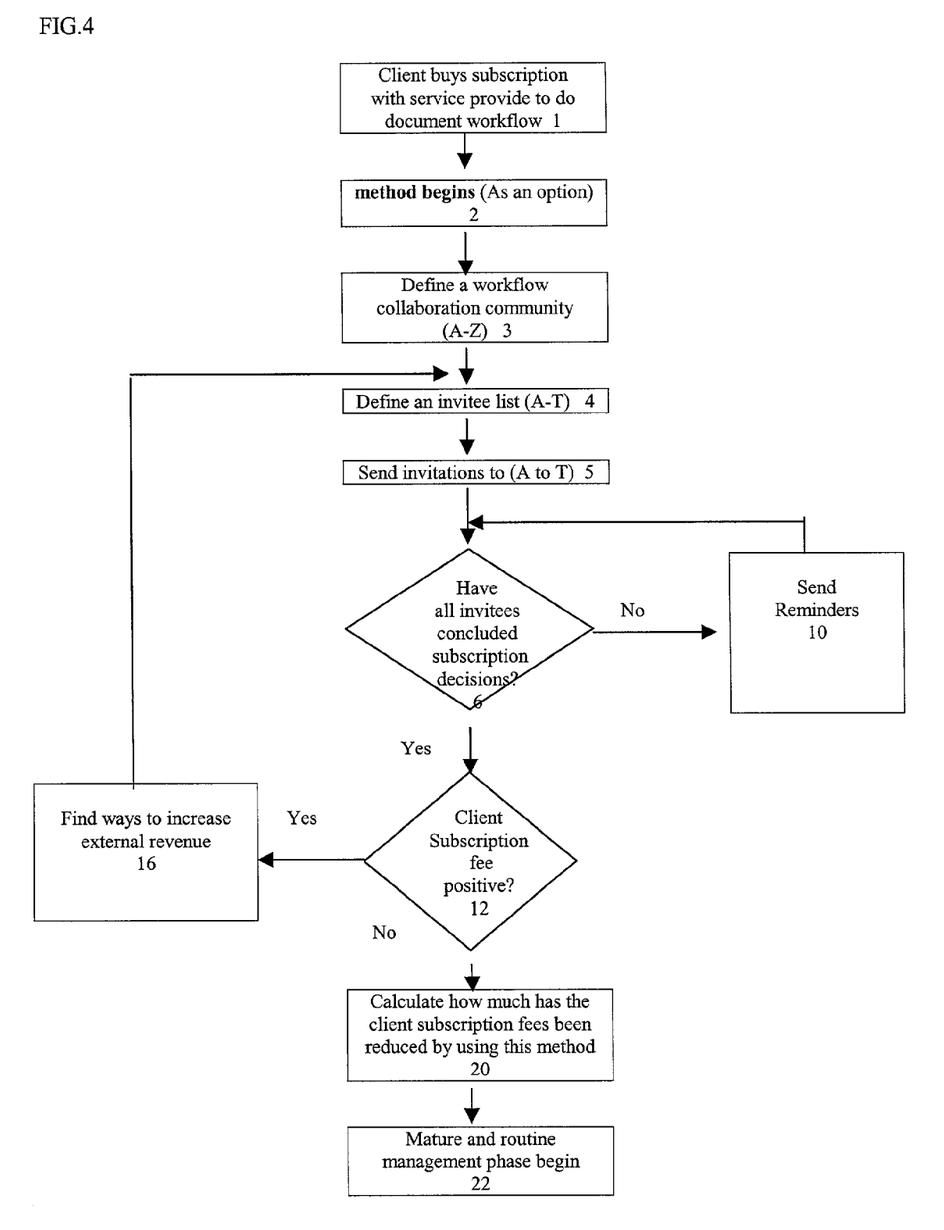
In FIG. 4, applying this method to a document workflow enterprise solution, as an example.

Referring to FIG. 4, at step 1, client buys a subscription with the service provider for usage of an enterprise solution for document workflow purposes. Typically, the subscription procedures end here.

At step 2, the client can use this method, as an option, to reduce his subscription fee.

At step 3, the client begins by defining all the partners that consists of A–Z, a total of twenty-six companies with whom he wishes to do workflow collaboration, thus defining his collaboration community.

At step 4, the client would create a list within the collaboration community, known as an invitee list, by using the billing solution facilitated by the service provider. The list consists of companies A to T, a total of twenty invitees. Notice that companies T to Z are not among the invitees because the client does not feel that they would buy the subscriptions.

At step 5, the solution would also facilitate mail merge, merging invitees with invitation templates to generate invitations, inviting invitees to buy subscriptions directly with the service provider.

At step 6, the client would use the billing system to monitor the number of indecisive invitees. If he feels that they should be reminded, he will proceed to generating more reminders via the billing system.

The reminder generation process would be repeated until hopefully all the invitees have concluded the subscription decisions.

There are times although the number of inconclusive invitees is still positive, the client may decide not to generate any reminders. Step 10 and step 12 can be executed in parallel.

At step 10, client would generate reminders via the client billing system from time to time to urge the indecisive invitees to quickly conclude the subscription decisions.

At step 12, until subscription fee reaches zero, the client should continue to find ways to increase external revenue. Please be advised that the client does not have to wait until his subscription fee has been reduced to zero before proceeding to step 20. Step 20 and 16 can be executed in parallel.

At step 16, the client would want to earn more credit by further increase external revenue, thus generating more credit to offset the subscription fee.

At step 20, at any time, the client is in a position to calculate how much credit he earned with the external revenue he generated. He can now see how much the subscription fee is reduced by using this method.

At step 22, the client now enters a more mature and routine management phase of managing the cost-sharing program.

Figure 5:
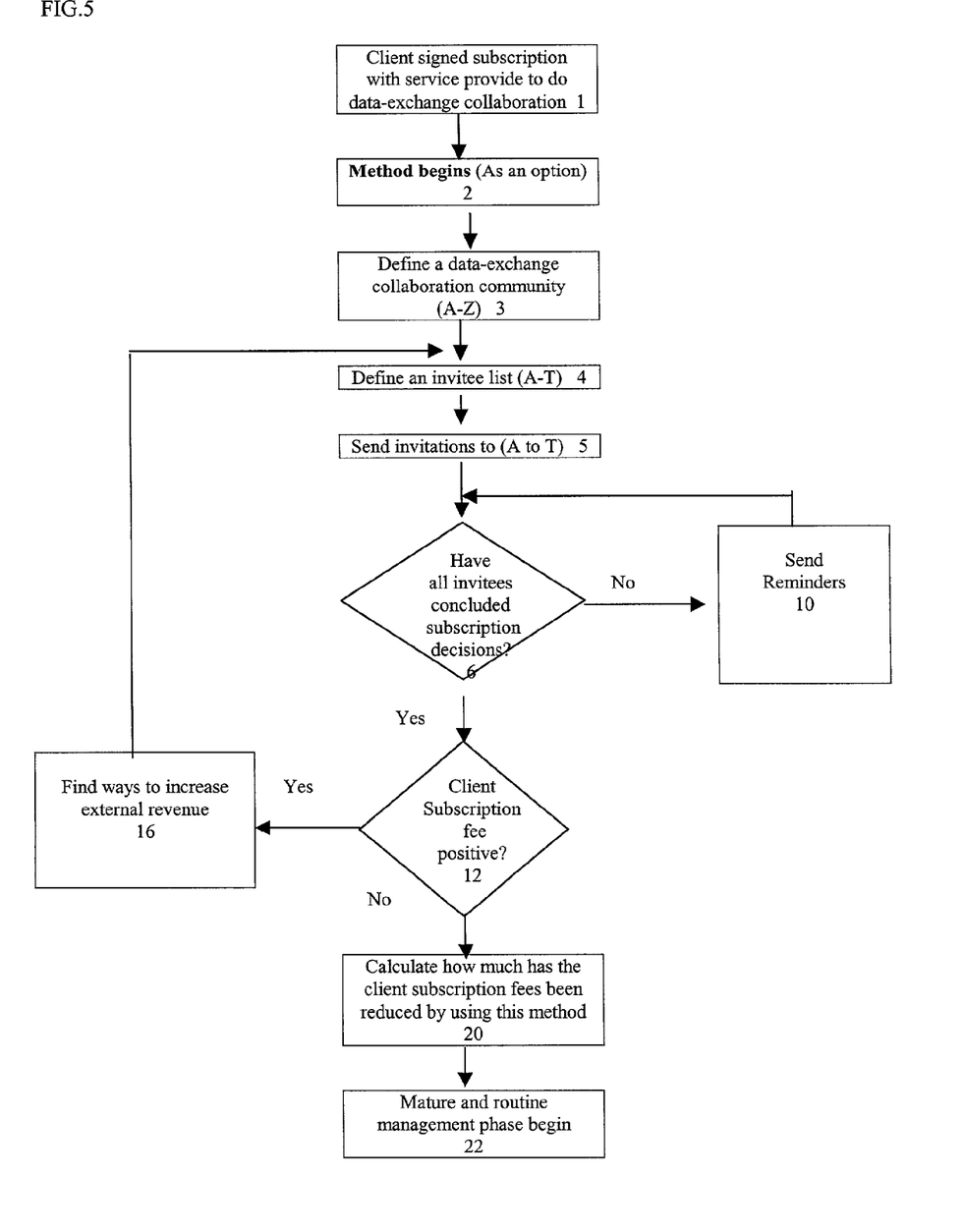
In FIG. 5, applying this method to a data-exchange extended enterprise solution, as an example.

Referring to FIG. 5, at step 1, client buys a subscription with the service provider for usage of an enterprise solution for data-exchange collaboration. Typically, the subscription procedures end here.

At step 2, the client can use this method, as an option, to reduce his subscription fee.

At step 3, the client begins by defining all the partners that consists of A–Z, a total of twenty-six companies with whom he wishes to do data-exchange collaboration, thus defining his collaboration community.

At step 4, the client would create a list within the collaboration community, known as an invitee list, by using the billing solution facilitated by the service provider. The list consists of companies A to T, a total of twenty invitees. Notice that companies T to Z are not among the invitees because the client does not feel that they would buy the subscriptions.

At step 5, the solution would also facilitate mail merge, merging invitees with invitation templates to generate invitations, inviting invitees to buy subscriptions directly with the service provider.

At step 6, the client would use the billing system to monitor the number of indecisive invitees. If he feels that they should be reminded, he will proceed to generating more reminders via the billing system.

The reminder generation process would be repeated until hopefully all the invitees have concluded the subscription decisions.

There are times although the number of inconclusive invitees is still positive, the client may decide not to generate any reminders. Step 10 and step 12 can be executed in parallel.

At step 10, client would generate reminders via the client billing system from time to time to urge the indecisive invitees to quickly conclude the subscription decisions.

At step 12, until subscription fee reaches zero, the client should continue to find ways to increase external revenue. Please be advised that the client does not have to wait until his subscription fee has been reduced to zero before proceeding to step 20. Step 20 and 16 can be executed in parallel.

At step 16, the client would want to earn more credit by further increase external revenue, thus generating more credit to offset the subscription fee.

At step 20, at any time, the client is in a position to calculate how much credit he earned with the external revenue he generated. He can now see how much the subscription fee is reduced by using this method.

At step 22, the client now enters a more mature and routine management phase of managing the cost-sharing program.

Figure 6:
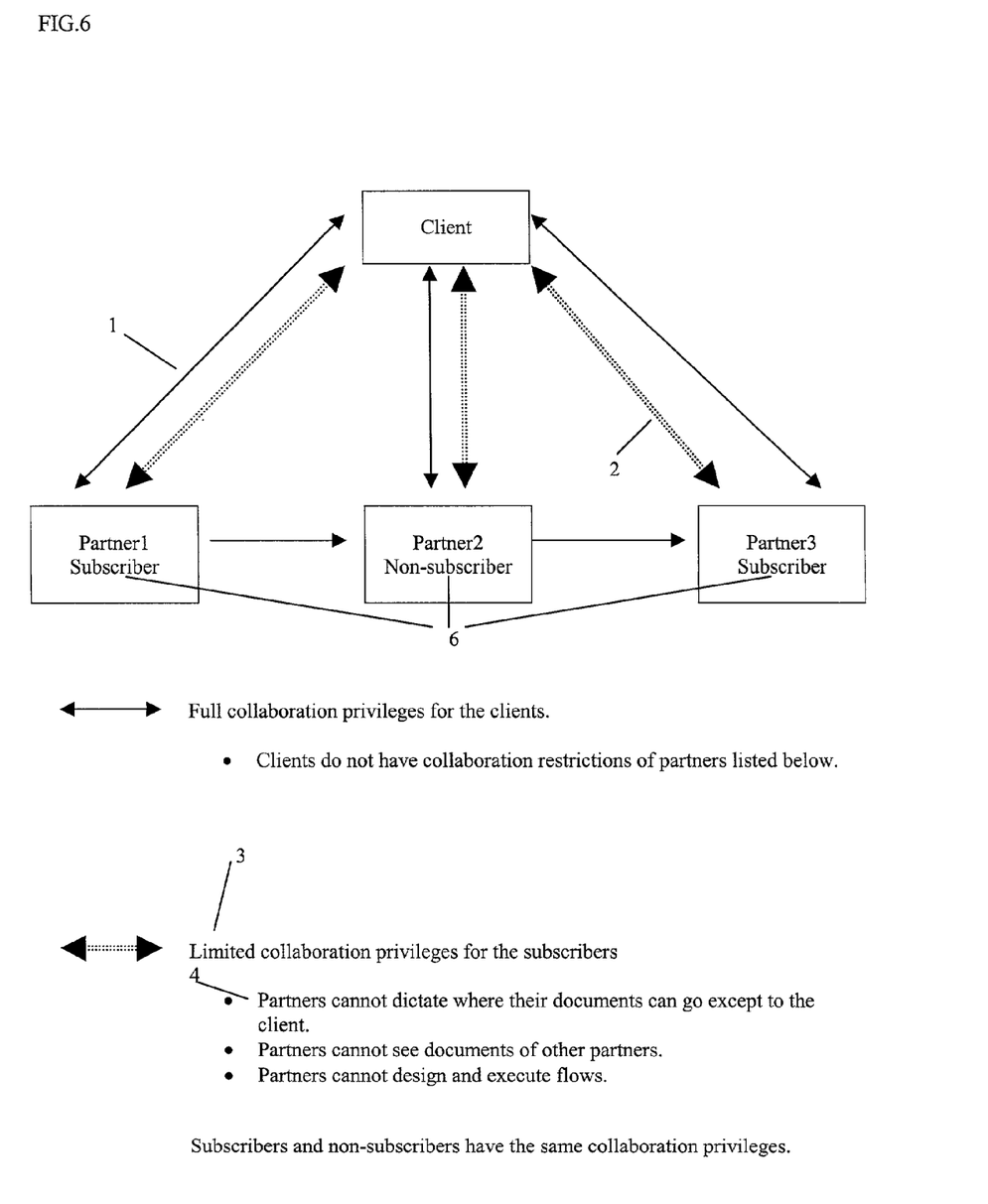
In FIG. 6, this diagram, using workflow as an example, illustrates collaboration privileges assigned to subscribers and clients that could, for example, be different.

Referring to FIG. 6, this example illustrates that the collaboration privileges of the client and the partners could, for example, be different.

A client can freely design a flow to collaborate with partners within his collaboration community. One way for a partner to process the same privileges as a client would be to buy the client subscription plan.

At label 1, the client designs a document workflow route as shown by the solid line arrows in diagram.

At label 2, the client is the only collaboration partner for the partners, as shown by the broken and doubled lined arrows At label 3, a list of partners limited privileges.

At label 4, notice partners in this flow diagram have collaboration privileges restrictions. Partners can only flow documents freely to the client but not to each other.

At label 6, this particular example involves three partners, two of whom are subscribers and one is not.

What is claimed is:

1. A method for executing an enterprise application via a network enabled system of a service provider to enable enterprise solution cost-sharing, the method comprising:
   establishing a hosted enterprise solution to be used by users in a collaboration community, in which the users communicate online, the users comprising a plurality of partners and a client;
   establishing an initial host subscription fee to be incurred by the client;
   providing a cost-sharing formula that is based on characteristics pertaining to a number of the users of the hosted enterprise solution, a modifiable number of subscribing partners, and a modifiable number of non-subscribing partners, wherein the subscribing partners represent a group of partners within the plurality of partners that pay a partner subscription fee while the non-subscribing partners represent the rest of the plurality of partners that do not pay the partner subscription fee;
   determining, using the cost-sharing formula, a cost-sharing value associated with the partner subscription fee to be paid by one or more of the subscribing partners;
   updating the initial host subscription fee to be incurred by the client using the determined cost-sharing value; and
   providing the hosted enterprise solution for use by the client, the subscribing partners and the non-subscribing partners.

2. The method of claim 1, wherein each subscribing partner is one of two or more types of subscribing partners, each type of subscribing partners having different usage privilege of the hosted enterprise solution.

3. The method of claim 1, wherein each of the subscribing partners, the partner subscription fee and the cost-sharing value are different.

4. The method of claim 1, further comprising accounting for any partner in the collaboration community who changes its status in regards to being or not being one of the subscribing partners.

5. The method of claim 1, further comprising providing different usage privileges of the hosted enterprise solution to the client, the subscribing partners and the non-subscribing partners.

6. The method of claim 1, further comprising determining usage privileges of the hosted enterprise solution for the one or more subscribing partners based on inputs from the client.

7. The method of claim 1, further comprising determining usage privileges of the hosted enterprise solution for the one or more non-subscribing partners based on inputs from the client.

8. The method of claim 1, further comprising communicating the balance of the host subscription fee to the client over the network.

9. The method of claim 1, further comprising tracking the host subscription fee as it is modified by the cost-sharing value contributed to by a given subscribing partner.

10. The method of claim 1, further comprising determining usage privileges of the hosted enterprise solution of the one or more partners in its collaboration community based on inputs from the client.

11. The method of claim 1, wherein the hosted enterprise solution comprises a data-exchange enterprise collaboration software solution.

12. The method of claim 1, wherein the hosted enterprise solution comprises a document workflow enterprise collaboration software solution.

13. The method of claim 1, wherein the host subscription fee is at least partially incurred by the client for using the hosted enterprise solution.

14. The method of claim 1, further comprising prior to determining the host subscription fee, generating a list of the partners that forms at least a portion of the collaboration community.

15. The method of claim 14, further comprising determining which partners in the list are to be invited to become subscribing partners of the hosted enterprise solution.

16. The method of claim 15, wherein determining which partners in the list are to be invited to become subscribing partners comprises determining which partners are to be invited based on a standard and open policy provided by the service provider.

17. The method of claim 15, further comprising tracking partners invited to become subscribing partners who decline subscriptions.

18. The method of claim 14, further comprising determining which partners in the list are to be allowed to become subscribing partners.

19. The method of claim 18, wherein determining which partners in the list are to be allowed to become subscribing partners is performed based on a standard and open policy.

20. The method of claim 14, wherein generating a list of partners that forms at least a portion of the collaboration community includes accommodating changes to how many partners comprise the collaboration community.

21. The method of claim 14, further comprising determining which partners in the list of partners are not to be invited to become subscribing partners of the hosted enterprise solution.

22. The method of claim 21, wherein determining which partners in the list of partners are not to be invited comprises determining which partners in the collaborating community are not to be invited based on a standard and open policy.

23. The method of claim 14, further comprising generating invitations to all the partners in the list to be invited to become subscribing partners.

24. The method of claim 14, further comprising modifying the list of the partners in the collaboration community based on inputs from the client.

* * * * *